Oct. 22, 1940.  M. M. RABELOS  2,218,854
CLOTHESLINE PULLEY
Filed Aug. 10, 1938
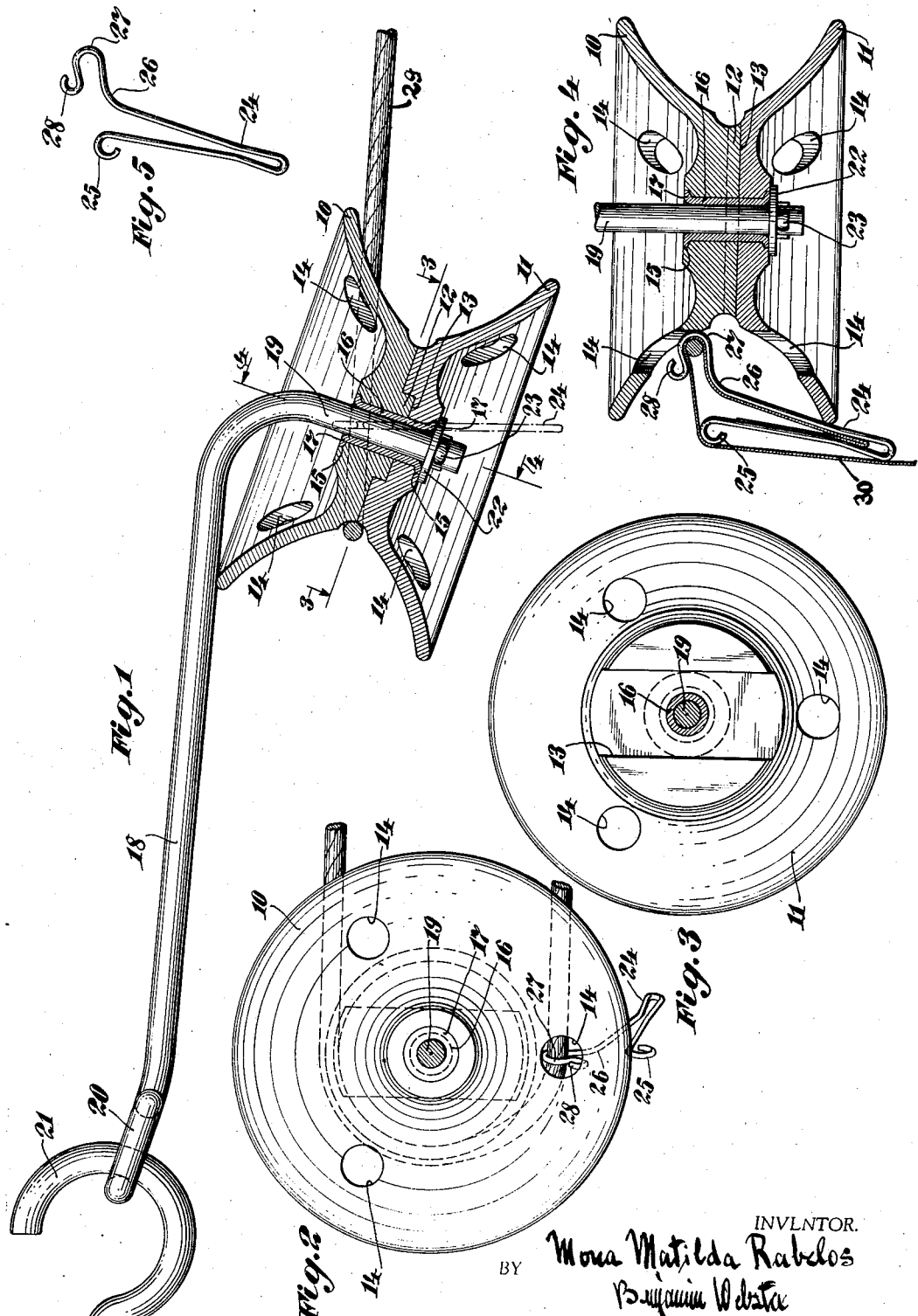
INVENTOR.
Mona Matilda Rabelos
BY Benjamin Webster
ATTORNEY.

Patented Oct. 22, 1940

2,218,854

UNITED STATES PATENT OFFICE 2,218,854

CLOTHESLINE PULLEY

Mona Matilda Rabelos, Greenwich, Conn., assignor to Reel-Rite Corporation, Greenwich, Conn., a corporation of Maine Application August 10, 1938, Serial No. 224,019

1 Claim. (Cl. 254—190)

This invention relates to a combined bearing, suspending, guiding and anchoring devices designed primarily for use in connection with a stretch of a clothesline, when the latter is used in a manner whereby it is pulled in a direction towards or from a housewife, maid or washerwoman for the purpose of attaching or detaching from the line articles being laundered, but it is to be understood, that a device, in accordance with this invention may be used in any connection for which it may be found applicable.

In clothesline pulleys that have concavities in the top that tend to collect dust and water there is a frequent tendency to soil the line and the clothing suspended on the line and it is an object of the invention to obviate this defect. In such pulleys there is a tendency of the line to slip in the pulley, but by providing circumferentially disposed recesses in the pulley and a specially formed fastening pin I provide a positive grip as the clothesline is drawn over and around the pulley.

Other objects of the invention are to provide, in a manner as hereinafter referred to, a device of the class referred to which is of reel-like form; strong; durable; compact; thoroughly efficient in its use for the purpose intended thereby; conveniently anchored in position and installed with respect to the line; readily repaired when occasion requires; capable of having a damaged part removed and a new part quickly installed thereby overcoming the necessity of discarding the entire device when a part thereof becomes damaged or impaired; and inexpensive to manufacture.

In a preferred form the clothesline pulley comprises two symmetrical parts rotatable as a unit on an axial bore, the parts being axially united together by a metal bushing which has outward flares at the top and the bottom, the two parts together forming an inner annular runway broad V-shaped in cross-section, each of the parts on one side providing a concavity in the form of a soup dish and radially apertured to permit the drainage of water therethru, the apertures also providing recesses in the walls of the runway for engaging clothesline fasteners or pins while they are supporting clothing on the line, a support circular in cross-section consisting of two arms bent at an acute angle with reference to each other, one of the arms formed into a support for engaging a hook, or the like, which is usually fastened to a post or to the outside of a house, and the other arm providing a bearing which passes through the metal bushing of the pulley, a washer on the arm below the pulley, means for holding the washer in such a position that the top edge of the pulley lies close to the supporting arm, the two parts of the pulley in addition to the securing metal bushing having one, a transverse concavity, and the other a transverse projection, the concavity and the projection being formed to exactly interfit each other and prevent rotation of the two parts of the pulley with respect to each other, and the fastener, or clothes pin, formed of spring wire with one part bent back toward the other to form a narrow V, one end of which terminates in an outwardly turned circular loop and the other end of which terminates in a loop in the same plane as the first loop, but the first part of the second loop extending outwardly and upwardly and the center of the loop formed in a half circle of such a size as to resiliently secure clothes on the line, the end of the wire being then led in and turned outwardly at the end in an oppositely reversed circular loop which, when the clothesline is drawn over the pulley, contacts the edge of an aperture in the runway to prevent the pulley from slipping on the clothesline.

Other objects will appear as the description proceeds. Reference is made to the drawing which illustrates a preferred modification of the invention in which, Figure 1 is a lengthwise vertical section showing the pulley in operative position.

Figure 2 is a top view.

Figure 3 is a top view of the lower part of the pulley on the line 3—3 of Figure 1.

Figure 4 is a section on the line 4—4 of Figure 1 in the direction of the arrows and showing a piece of clothing suspended on the clothesline and engaging the hook.

Figure 5 is a plan of the clothesline.

Referring to the drawing, the pulley proper is moulded from plastic material and comprises an upper part 10 and a lower part 11, the upper surface of the part 10 and the lower surface of the part 11 being bowl or dish-shaped, and secured together against independent rotative movement by a diametrical projection 12 on the lower part of the part 10 and a diametrical concave recess 13 of the same size and form as the projection 12 and formed on top of the part 11.

Symmetrical holes 14 disposed 120 degrees apart, as shown in the drawing, provide means for draining the water that may accumulate on the top out of the dish-shaped concavity. They also serve another purpose more clearly brought out in Figure 4 for engaging the clothes hook 24 to prevent the line from slipping with reference to the pulley as the clothesline is drawn in to adjust the suspended clothing. A metal bushing 16, cylindrical in form, passes thru an axial bore formed in the two parts, the bore having outer end flares to provide seats 15 in which flanges 17 of the bushing 16 are pressed at both ends to bind the two parts securely together. A supporting arm 18 formed of a round rod, has a hook 20 at the left end to slip over the usual hook 21 which is mounted on a house or post and at the right is bent down to form a short arm 19 so positioned that it and the arm 18 define an acute angle. A washer 22 is so positioned on the lower end of the short arm 19 by means of a cotter pin 23 that it engages the part 11 and holds the upper edge of the part 10 in engagement with the lower side of the arm 18 to prevent clothing entering therebetween to jam or prevent the pulley from rotating.

A clothesline hook 24 has two main arms formed in the shape of a narrow V, the upper left end being turned outwardly in a circular loop 25 and the right end 26 being lead outwardly and upwardly at a small angle and terminating in a semi-circular loop 27, the upper end of the loop 27 being turned back in an outwardly turned circular loop 28. By referring to Figure 4, it is seen how a fabric or article of cloth 30 is secured on the clothes line 29 with the hook 24. The upper end of the fabric is turned over the clothesline 29 and forced down in the narrow V of the hook 24, which is formed of spring or resilient material to resiliently hold the fabric. The curved portion 27 being resilient also presses tight on the yieldable line 29 and engages the fabric in more than a half circle, the fabric lying out over the loop 25 which provides a smooth surface for suspension of the clothing. The curved hook 28 also prevents the fabric from being torn, the end being bent away from it when in operative position. By referring to Figures 1 and 4, it is seen that the clothesline 29 as it moves forms an angle which is greater than a right angle with reference to the axis of the pulley so that the backs of the loops 27 which lie inside the line 29, in case of any slipping of the line on the pulley, drop into the bottoms of the holes 14 in the upper part 10 and positively engage the pulley to cause it to turn in case of any binding on the post 19.

It is clear that my improved pulley formed of plastic material is simple in construction, of low manufacturing cost and provides such a pulley in which no dirt or soiled water can accumulate to spill over and mar the wash. It is also clear that my construction of the arms 18 and 19 prevents the entrance of the clothes between the pulley and the arm so that there will be no jamming due to wash blown by the wind getting between the pulley and the arm. It is also clear that I position and provide the holes 14 so that they engage the back of a specially formed clothes hook 24 so that in operation the rear extension 27 engages a hole 14 to prevent the pulley from binding on the post 19. Having shown and described a preferred modification of the invention and realizing that many changes will occure to those skilled in the art in view of my disclosure, I do not choose to limit myself except as in the appended claim.

I claim:

A clothesline pulley comprising, in combination, two symmetrical parts rotatable as a unit on an axial bore, which together form an inner annular runway broad V-shaped in cross-section, the parts being formed of moldable material and having inside flat surfaces one of which has a concave transverse recess and the other a transverse projection adapted to engage the recess, the parts having an axial bore flared at the outside end, and the parts being locked together by an axial hollow cylindrical bushing flared outwardly at each end, each of the parts on one side being in the form of a soup-dish and radially apertured to permit drainage of rain water therethru, the apertures also providing recesses in the walls of the runway near the bottom of the V for engaging clothesline fasteners while they are supporting clothing, a support having a downwardly and rearwardly inclined arm mounting the bushing and a washer secured to the bushing to hold the top edge of the upper part near enough the arm to prevent a clothesline entering between them.

MONA MATILDA RABELOS.